UNITED STATES PATENT OFFICE.

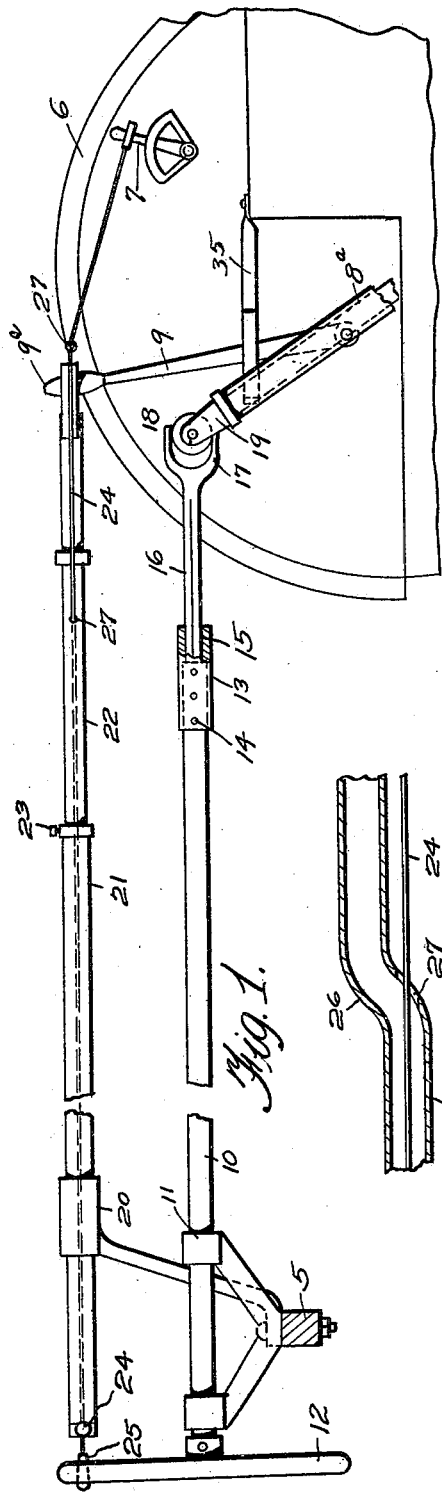

HERMAN J. VIRGENS, OF WELCOME, MINNESOTA.

CONTROLLING MECHANISM FOR TRACTORS.

1,407,606.  Specification of Letters Patent. Patented Feb. 21, 1922.

Application filed August 22, 1921. Serial No. 494,246.

*To all whom it may concern:*

Be it known that I, HERMAN J. VIRGENS, a citizen of the United States, residing at Welcome, in the county of Martin and State of Minnesota, have invented certain new and useful Improvements in Controlling Mechanism for Tractors, of which the following is a specification, reference being had therein to the accompanying drawings.

This invention relates to a controlling mechanism for tractors of the general character of that shown in my Patent 1,377,448 and its object is to provide an improved arrangement and correlation of parts by virtue of which the mechanism may be rendered economical of construction. A further and important object of the invention is to provide such a combination and correlation of parts as will render the mechanism adaptable for use upon the well known and largely used Hart-Parr tractor, whereby such tractor may be effectually controlled by a driver seated upon a harvester or other agricultural machine which is being drawn by the tractor.

Further objects and advantages of the invention will be set forth in the detailed description which follows.

In the accompanying drawing:

Fig. 1 is a view partly in elevation and partly in section of a tractor controlling mechinsm showing the same associated with a Hart-Parr tractor;

Fig. 2 is a plan view of the mechanism;

Fig. 3 is a fragmentary sectional view through a part of a clutch controlling rod hereinafter described; and Fig. 4 is a sectional view upon lines 4—4 of Fig. 2.

Like numerals designate corresponding parts throughout the several figures of the drawing.

In the drawing 5 designates any suitable one of the frame members of a harvester or other agricultural implement and 6 designates a Hart-Parr tractor. The usual controlling mechanism of the tractor named comprises a throttle lever 7, a steering post $8^a$ and a clutch control lever 9 and the mechanism constituting the subject matter of the present invention is designed to control these several elements from a point upon the harvester 5. To this end a steering rod 10 of any suitable length is mounted to turn in supporting brackets 11 carried by the frame member 5. A hand steering wheel 12 provides means whereby the driver may impart a turning movement to the rod 10. The rod 10 may be and preferably is of tubular formation and carries at its forward end a sleeve-like casting 13 the rear end of which is of a diameter such that it may fit over the rod 10 and be secured thereto by pins 14. The forward end of the sleeve 13 is reduced internally to provide an angular bore 15 which receives the angular rear end of a rod 16. The forward end of the rod 16 is shaped to constitute one of the elements 17 of a universal joint 18, this universal joint being completed by the upper end 19 of the steering post. Thus turning movement of the steering rod 10 will impart a turning movement to the steering post $8^a$.

A clutch control rod is slidably mounted in a bearing 20 that is supported from the frame member 5 of the harvester and this clutch control rod comprises a telescopic sleeve consisting of a rear member 21 and a front member 22, the latter being slidable in the former and being secured at any suitable point therein by means of set screw 23. A hand grasp 24 at the rear end of the clutch control rod provides means for imparting bodily longitudinal movement to said rod to thereby effect the shifting of the clutch control lever 9, the forward end of said rod being clamped to the hand grasp portion $9^a$ of said lever.

A throttle control wire or rod 24 slides through the clutch control rod and is provided with a hand grasp 25 upon its rear end. The clutch control rod is offset at 26 and is provided with an opening 27 at said offset portion through which the throttle control wire 24 passes. The wire 24 is preferably jointed at 27, though it may be otherwise more or less flexible.

Longitudinal movement of the clutch control rod may be effected independently of the movement of the throttle control wire and vice versa. To properly support lever 9 against twisting strains due to the actuation of the same from a distance, I provide a guide yoke consisting of the parts 35 and 36 which may be adjusted toward and from each other by means of a clamp 37. The part 35 embraces the lever 9 and guides and supports the same. The part 35 is secured to a part of the tractor at 38 and the part 37 is secured to the sleeve 8 of steering post $8^a$.

It is to be understood that the invention is not limited to the precise construction set forth but that it includes within its purview whatever changes fairly come within either the terms or the spirit of the appended claims.

Having described my invention, what I claim is:

1. Means for controlling a tractor from a vehicle being drawn by said tractor comprising a steering element, means for connecting the same to the steering post of the tractor, a tubular clutch control rod, means for mounting the clutch control rod for bodily longitudinal movement and a throttle control wire or rod passing through the clutch control rod and capable of independent longitudinal movement with respect thereto.

2. Means for controlling the mechanism of a tractor from a vehicle being drawn by said tractor comprising a tubular clutch control rod having an offset portion, a hand grasp upon the rear end of said clutch control rod, a throttle controlling member passing through the clutch control rod and passing therefrom at said offset portion, a hand grasp upon the rear end of the throttle controlling rod and means for connecting the clutch control rod and the throttle control rod to the clutch control lever and the throttle control lever, respectively, of a tractor.

3. A structure as recited in claim 2 wherein the clutch control rod is adjustable as to length.

4. A structure as recited in claim 2 wherein the throttle control rod is flexible.

In testimony whereof I hereunto affix my signature.

HERMAN J. VIRGENS.